United States Patent [19]
Suzuki et al.

[11] Patent Number: 5,847,848
[45] Date of Patent: Dec. 8, 1998

[54] IMAGE PROCESSING APPARATUS WHICH PREVIEWS BOTH INPUT AND EDITED IMAGE DATA

[75] Inventors: Yasumichi Suzuki; Mitsuru Kurita, both of Yokohama, Japan

[73] Assignee: Canon Kabushiki Kaisha, Tokyo, Japan

[21] Appl. No.: 498,872

[22] Filed: Jul. 6, 1995

[30] Foreign Application Priority Data

Jul. 6, 1994 [JP] Japan .................................. 6-154536

[51] Int. Cl.⁶ ........................................................ H04N 1/46
[52] U.S. Cl. ........................... 358/518; 358/500; 358/527
[58] Field of Search .................................... 358/518, 527, 358/537–538, 452–453

[56] References Cited

U.S. PATENT DOCUMENTS

| | | | |
|---|---|---|---|
| 4,714,962 | 12/1987 | Levine | 358/518 |
| 4,873,570 | 10/1989 | Suzuki et al. | 358/80 |
| 4,982,277 | 1/1991 | Katoh et al. | 358/80 |
| 4,996,591 | 2/1991 | Kadowaki et al. | 358/80 |
| 5,034,806 | 7/1991 | Ikeda et al. | 358/75 |
| 5,113,252 | 5/1992 | Horie et al. | 358/77 |
| 5,119,185 | 6/1992 | Ikeda et al. | 358/75 |
| 5,138,443 | 8/1992 | Ikeda et al. | 358/80 |
| 5,166,786 | 11/1992 | Sakai et al. | 358/76 |
| 5,206,719 | 4/1993 | Ikeda et al. | 358/80 |
| 5,239,383 | 8/1993 | Ikeda et al. | 358/300 |
| 5,257,097 | 10/1993 | Pineau et al. | 358/500 |
| 5,267,031 | 11/1993 | Katoh et al. | 358/527 |
| 5,381,248 | 1/1995 | Ikeda et al. | 358/538 |
| 5,422,739 | 6/1995 | Usami et al. | 358/518 |
| 5,608,549 | 3/1997 | Usami | 358/518 |
| 5,675,717 | 10/1997 | Yamamoto | 395/109 |

*Primary Examiner*—David K. Moore
*Assistant Examiner*—Stephen Brinich
*Attorney, Agent, or Firm*—Fitzpatrick, Cella, Harper & Scinto

[57] ABSTRACT

There is provided an image processing apparatus capable of providing preview display reflecting the result of editing operation and more faithful to the final image even in case an editing operation is conducted. The apparatus is provided with an input device for entering image data corresponding to an original image, an editing process unit for effecting an editing process on the image data entered by the input device, an image output device for forming an image based on the image data released from the editing process unit, a first preview image data output unit for releasing preview image data based on the image data entered by the input device, and second preview image data output unit for releasing preview image data based on the image data subjected to the editing process in the editing process unit.

11 Claims, 7 Drawing Sheets

IMAGE PROCESSING APPARATUS WHICH PREVIEWS BOTH INPUT AND EDITED IMAGE DATA

BACKGROUND OF THE INVENTION

1. Field of the Invention

The present invention relates to an image processing apparatus capable of generating an image signal for previewing the image output by an output device, and a method therefor.

2. Related Background Art

As a result of recent changes in the copying machines toward color image formation or more diversified functions, there is being encountered a drawback of increased time and cost as the user print the image on the recording sheet repeatedly before a desired color or a desired result of image edition is obtained. For avoiding such drawback, there are proposed copying machines with previewing function, for enabling confirmation of the image on a display such as a cathode ray tube, instead of image output on the recording sheet.

One of such apparatus employs a black-and-white liquid crystal display for displaying the read original image for the confirmation purpose, but, if the copying machine has full-color copying capability, the result of color adjustment or color conversion cannot be confirmed on such black-and-white liquid crystal display. For this reason there is recently proposed a previewing system in which the display device can also provide full-color display. FIG. 8 shows an example of such system, in which blocks 1–6 constitute a full-color copying apparatus while blocks 7–9 constitute a previewing system.

There are provided a sensor 1 for reading an original image and releasing R, G, B image data; an A/D converter 2 for effecting A/D conversion and shading correction; a sensor color correction circuit 3 for correcting the spectral characteristics of the sensor; a luminance/density conversion circuit 4 for converting luminance information into density information; an image editing circuit 5 for effecting various image editing operations; and a printer unit 6 for output of a full-color image based on the image data obtained by scanning the original image with the sensor 1 three or four times.

There are also provided a memory 8 for storing the R, G, B signals released from the sensor color correction circuit 3; and a cathode ray tube (CRT) 9 for providing a display based on the R, G, B signals stored in the memory 8.

Also a CPU 7, for arbitrarily processing the data in the memory 8, is connected to effect, via software, a process equivalent to that of the editing circuit 5, thereby displaying a final image.

However the first-mentioned display method has been associated with a drawback that the full-color display merely indicates the read image but does not reflect the results of various image editing operations.

Also the second-mentioned display method has been associated with a drawback that the image processing in the copying apparatus, if all replaced by software process, requires an enormous amount of software, and, if more diversified functions are incorporated, the software process time correspondingly increases to a level inefficient in time and cost.

SUMMARY OF THE INVENTION

In consideration of the foregoing, the object of a first invention of this application is to effectively provide a preview image reflecting the result of image editing even when the image editing is conducted.

The object of a second invention of this application is to effectively provide a preview image based on the preset editing procedure.

The object of a third invention of this application is to enable generation of image data to be supplied to display means through a simple processing.

The object of a fourth invention of this application is to provide preview display in efficient way in time.

For attaining the foregoing objects, the present invention provides following configurations.

According to the first invention of this application, there is provided an image processing apparatus comprising input means for entering image data corresponding to an original image; editing process means for effecting an editing process on the image data entered by said input means; image output means for forming an image based on the image data released from said editing process means; 1st preview image data output means for releasing preview image data based on the image data entered by said input means; and 2nd preview image data output means for releasing preview image data based on the image data subjected to the editing process in said editing process means.

According to the second invention of this application, there is provided an image processing apparatus comprising input means for entering image data corresponding to an original image; setting means for setting an editing process; editing process means for executing the editing process set by said setting means; 1st preview image data output means for releasing preview image data based on the image data entered by said input means; 2nd preview image data output means for releasing preview image data based on the image data subjected to the editing process in said editing process means; and selection means for selecting said 1st preview image data output means or said 2nd preview image data output means based on the editing process set by said setting means.

According to the third invention of this application, there is provided an image processing apparatus comprising input means for entering image data corresponding to an original image; 1st output means for output in a 4-color mode, with undercolor removal and black color formation, of the image data entered by said input means; and 2nd output means for output in a 3-color mode of the image data entered by said input means, wherein said 2nd output means for output in the 3-color mode is used in the previewing operation.

Still other objects of the present invention, and the features thereof, will become fully apparent from the following detailed description to be taken in conjunction with the attached drawings.

DESCRIPTION OF THE PREFERRED EMBODIMENTS

[1st embodiment]

Now there will be given a detailed explanation on a first embodiment of the present invention, with reference to the attached drawings.

Figure 1:
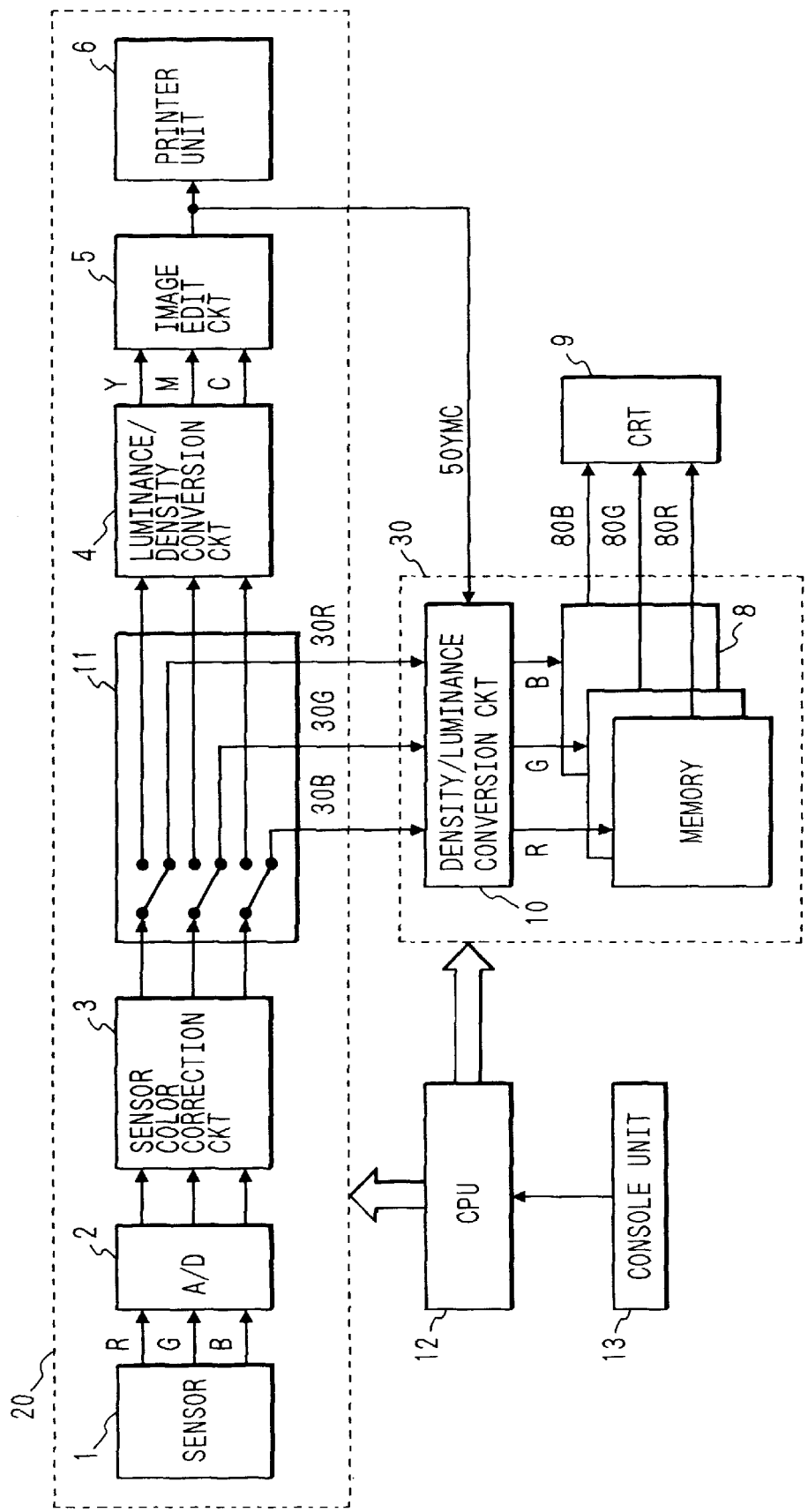
FIG. 1 is a block diagram of an embodiment of the image processing apparatus of the present invention.

FIG. 1 is a block diagram showing an example of the image processing apparatus constituting the present embodiment.

(Printing operation)

Referring to FIG. 1, an image processing unit 20 effects an ordinary printing operation.

A sensor 1, consisting for example of a photoelectric conversion device such as a CCD provided with color-separating filters, releases R, G, B image signals by reading the image of an unrepresented original in 3 or 4 scanning motions effected by an unrepresented motor. An A/D conversion circuit 2 is composed of an A/D converter and a shading correction circuit. The A/D converter converts analog R, G, B image signals, entered from the sensor 1, into digital R, G, B image signals which are corrected in the succeeding shading correction circuit according to the unevenness in the light amount in the original image reading or the characteristics of the sensor 1. A sensor color correction circuit 3 corrects the spectral characteristics of the color separating filters of the sensor 1. A luminance/density conversion circuit 4, composed of a so-called logarithmic conversion circuit and a printer color correction circuit, converts the R, G, B luminance signals, supplied from the sensor color correction circuit 3, into Y, M, C or Y, M, C, K density signals. The printer color correction circuit corrects the density signals, such as Y, M, C image signals, according to the printer characteristics or the spectral reflecting characteristics of the coloring materials employed in a printer 6, and converts the parallel input image data into serial frame-serial signals. The sensor 1 scans the original repeatedly by a number of times corresponding to the number of the coloring materials employed in the printer 6 or to said number plus the pre-scanning. Consequently the printer color correction circuit effects the color correction based on the density signals from the image data obtained by repeated readings of the sensor 1. The printer 6 effects full-color printing by superposing coloring materials of several basic colors. The present embodiment employs the coloring materials of Y (yellow), M (magenta) and C (cyan), but the number of the coloring materials is not limited to three but can be four, consisting of Y, M, C and K (black). An image editing circuit 5 effects various editings, for example color editing or image editing, such as color balancing, image size change, image displacement, mirror image formation, negative/positive conversion, contour formation, image repeating or image area extraction, which are all set or adjusted from an operation console unit 13 whereby the image data entered into the image editing circuit 5 are programmably processed by a CPU 12. After all the processes in the image editing circuit 5, the frame-serial image data are supplied to the printer unit 6 in synchronization with a synchronization signal therefrom, and the printer unit 6 superposes the coloring materials according to the image data thereby forming a desired image. The image data flow in the above-mentioned manner in case of the data output in the image processing apparatus of the present embodiment.

(Previewing operation)

Now there will be explained a preview process unit 30 employed in the previewing operation.

In a first system of image data flow, the R, G, B signals released from the sensor color correction circuit 3 are transmitted through a density/luminance conversion circuit 10, then stored in respectively corresponding memories 8, and supplied to a CRT for display.

In a second system of image data flow, the frame-serial output signals released from the image editing circuit 5, after the luminance/density conversion and image processing such as image editing, are supplied to the density/luminance conversion circuit 10 for an inverse conversion from the density information into the luminance information, which is inverse to the conversion in the luminance/density conversion circuit 4. The R, G, B luminance signals obtained by said inverse conversion are stored in the R, G, B memories 8 and displayed on the CRT 9. In this case, as the image data pass the main image processing circuit, the image displayed on the CRT 9 reflects the applied image processing and corresponds to the image to be formed by the printer.

Consequently, the precise final image can be confirmed within a short time.

Also in case of conducting an editing process, the second system is selected to preview, on the CRT, the image to be printed after such editing process, and in case of not conducting the editing process, the first system is selected to obtain the preview image data without passing the luminance/density conversion circuit 4 and the density/luminance conversion circuit 100 present in the second system, whereby obtained, on the CRT, is a preview image not containing the errors resulting from the conversion and thus faithful to the printed image.

The first and second systems are switched by a selector 11 which is controlled by the VPU 12 according to whether an image editing is set in the operation console unit.

Also in case the present invention is applied to an equipment in which the image processing is conducted by a hardware, such as a color copying machine, the editing process in generating the preview image data need not be conducted by the software but can be achieved by the hardware, whereby it is rendered possible to reduce the burden on the CPU and to generate the preview image data efficiently in time and in cost.

Figure 2:
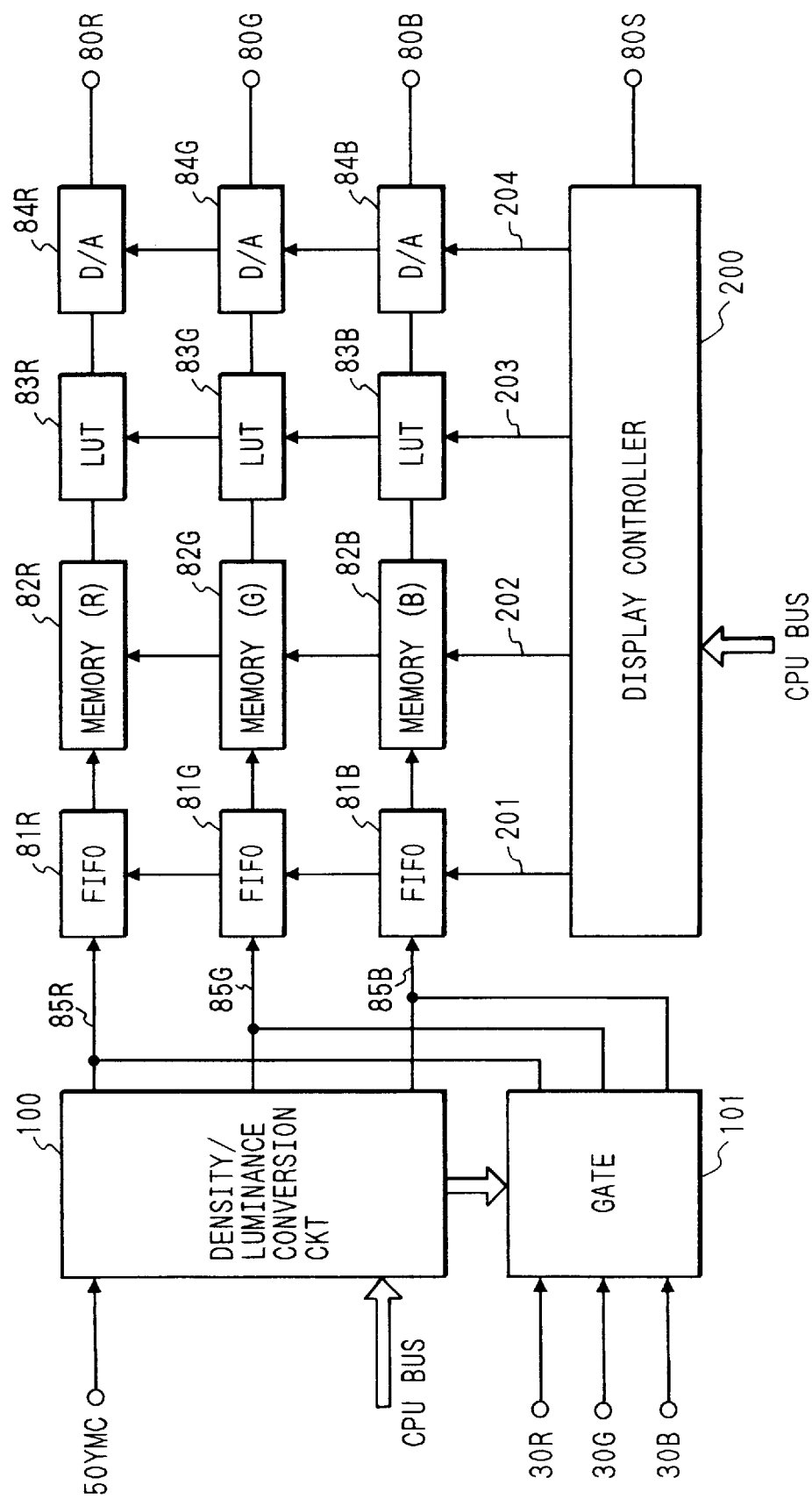
FIG. 2 is a block diagram of an embodiment of a display control circuit of the present invention.

FIG. 2 is a block diagram showing detailed configuration of a preview display process unit 30 for processing the read image data for display on the CRT 9.

The R, G, B output signals 30R, 30G, 30B from the sensor color correction circuit 3 shown in FIG. 1 are supplied, through a gate 101, respectively to first-in-first-out registers (FIFO's) 81R, 81G, 81B. These FIFO's are provided for effecting, under the control by a control line 201 from a display controller 200, rate conversion of the high-speed image data in the main body for storage in display memories 82R, 82G, 82B and a size conversion to the display area size and are set by the program of the CPU 12. The memories 82R, 82G, 82B are composed of video display RAM's, and the data write-in and read-out are controlled by a control line 202 from the display controller 200. The memories 82R, 82G, 82B have a memory size larger than the size of display, and the data can be read from an arbitrary position in the memory or with a change in the size. Look-up tables (LUT's) 83R, 83G, 83B are provided to effect correction for the characteristics of the CRT 9 and are so designed to enable arbitrary correction. These LUT's 83R, 83G, 83B may also be so designed as to effect correction on the characteristics of the printer in addition to those of the CRT 9, thereby matching the output of the printer unit 6 with that of the CRT 9. Analog output signals 84R, 84G, 84B, obtained by D/A conversion circuits respectively for the signals 80R, 80G, 80B, are supplied, together with a synchronization signal 80C from the display controller 200, to the CRT 9 for display.

On the other hand, the frame-serial signals 50YMC corresponding to the final image after the image processing explained in FIG. 1 is entered into a density/luminance conversion circuit 100, effecting a conversion inverse to that in the luminance/density conversion circuit 4, for achieving conversion again into luminance signals. The supplied frame-serial signal is stored in FIFO's 82R, 82G, 82B, and subjected thereafter to the control as explained above, thus displayed on the CRT 9.

Figure 3A:
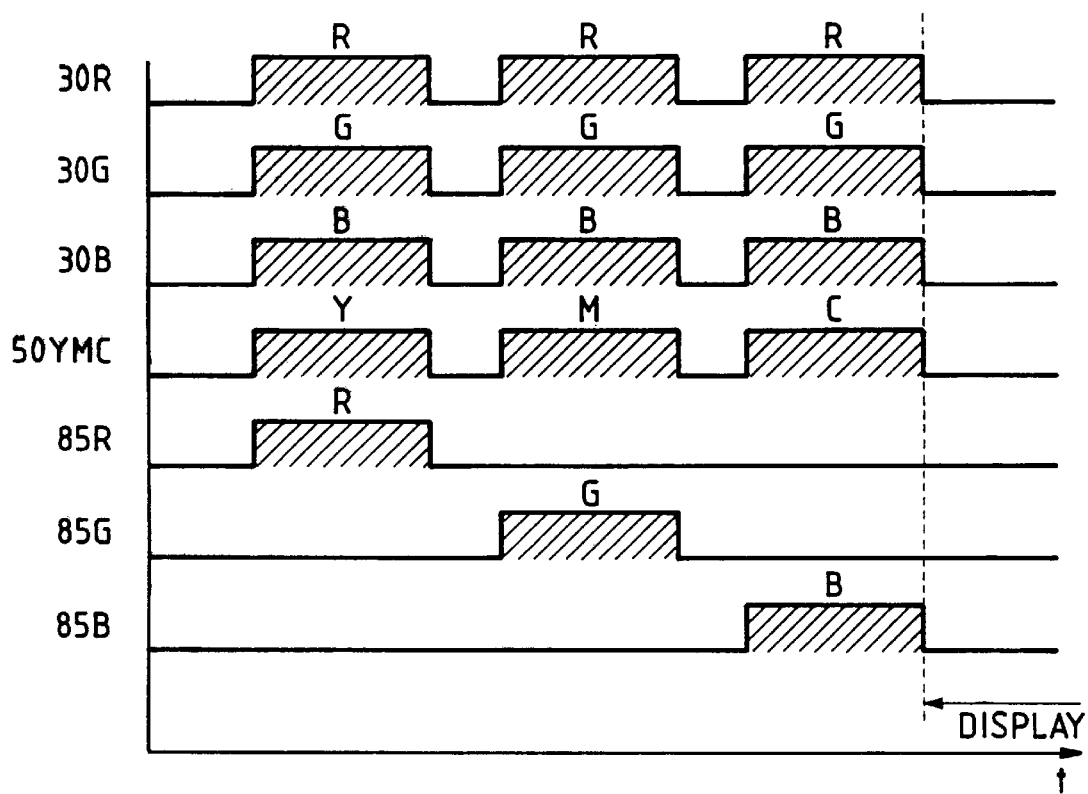
FIG. 3A is a timing chart showing a first display timing of the present invention.
Figure 3B:
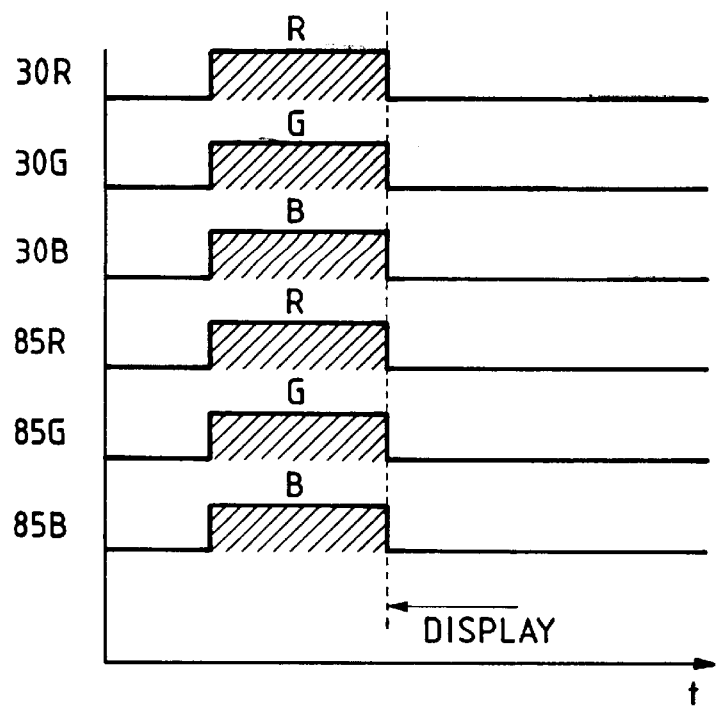
FIG. 3B is a timing chart showing a second display timing of the present invention.

FIGS. 3A and 3B are timing charts showing the timing from the start of preview to the actual display. FIG. 3A shows the case of display for the signal 50YMC, subjected to the image processing in the main body, wherein the display is enabled, in the present embodiment, after 3 scans.

FIG. 3B shows the case of display for the parallel signals 30R, 30G, 30B not subjected to the image processing in the main body, wherein the display is enabled after one scan.

Figure 4:
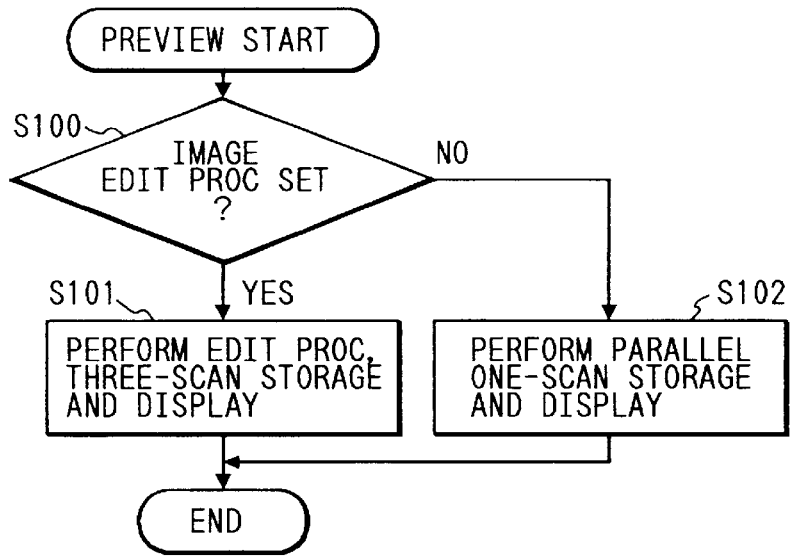
FIG. 4 is a flow chart showing the image processing of a first embodiment of the present invention.

FIG. 4 is a flow chart of a process of automatic selection of the display path by the CPU 12 according to the mode set by the operation console unit 13.

In case a preview start key in the operation console unit 13 is depressed prior to the start of the printing operation, a step 100 discriminates whether an image editing process has been set. If not, a step S102 stores the output signals 30R, 30G, 30B of the sensor color correction circuit 3 shown in FIG. 1 in parallel manner in the memories 8 in one scan, and effects display on the CRT 9. On the other hand, if the step S100 identifies that the image editing process has been set, the editing process is conducted in the same manner as in the actual printing operation, and the signals are stored in the memories 8 after 3 scans as shown in FIG. 3A and displayed on the CRT 9 (step S101).

Thus, in case the image editing process has not been set, the display on the CRT can be obtained within a short time, i.e. after a scan, and the user can confirm the preview image of the original and can set the image editing process based on thus confirmed preview image. On the other hand, in case the image editing process has been set, the user can confirm the result of such image editing process.

[2nd embodiment]

In the following there will be explained the 2nd embodiment of this application with reference to the attached drawings.

The entire configuration of the image processing apparatus of this embodiment is same as that shown in FIG. 1.

Figure 5:
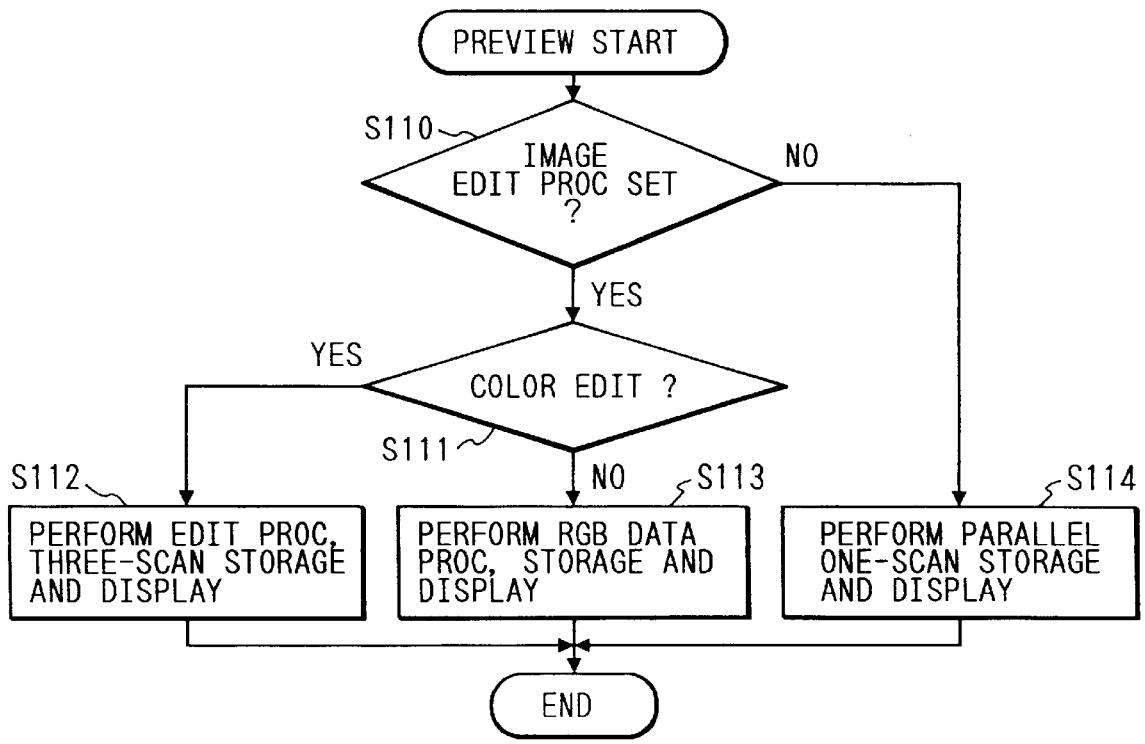
FIG. 5 is a flow chart showing the image processing of a second embodiment of the present invention.

FIG. 5 is a flow chart showing the process of the 2nd embodiment for selecting the display control according to the copying mode. A step S110 discriminates whether the image editing process has been set in the same manner as in the 1st embodiment, and, if it has not been set, a step S114 effects display in a scan. If the step S110 identifies that the image editing process has been set, a step S111 discriminates whether the set image editing contains a color editing, relating to colors. Such color editing means an editing operation involving a change in colors, or in the RGB ratio, such as a change in color balance, a change in color mode, a painting operation or a color conversion. If such color-involving editing is set in the step S111, a step S112 effects display in three scans.

On the other hand, if the step S111 identifies that the color editing has not been set but only an image editing, not involving the color change, such as a change in image magnification, an image displacement or a mirror image formation, has been set, a step S113 causes the R, G, B signals to be transmitted through the luminance/density conversion circuit 4, without processing therein, to the image editing circuit 5. The signals also pass through the density/luminance conversion circuit 10 and all the processes are conducted in R, G, B data, which are then stored in the memories 8 and displayed as a preview image on the CRT 9.

In this manner the R, G, B color component data are passed in the lines for the Y, M, C component data, and are subjected to the image processing not involving color change, and thus processed R, G, B color component data are released in succession to the display process unit 30.

The above-mentioned editing process not involving color change, such as a change in image magnification, an image displacement or a mirror image formation corresponds to an image processing achievable by an address conversion.

Consequently there can be obtained a precise and faithful preview image, owing to the absence of image deterioration in the luminance/density conversion circuit 4 and in the density/luminance conversion circuit 10.

The display in this case is obtained after 3 scans as in the step S111 because the image editing circuit 5 of the printing process unit 20 is utilized, but the preview display unit can be simplified in structure and reduced in the burden, as the image editing circuit 5 can be used also in the preview display.

[3rd embodiment]

In the following there will be explained a 3rd embodiment of the present application.

Figure 7:
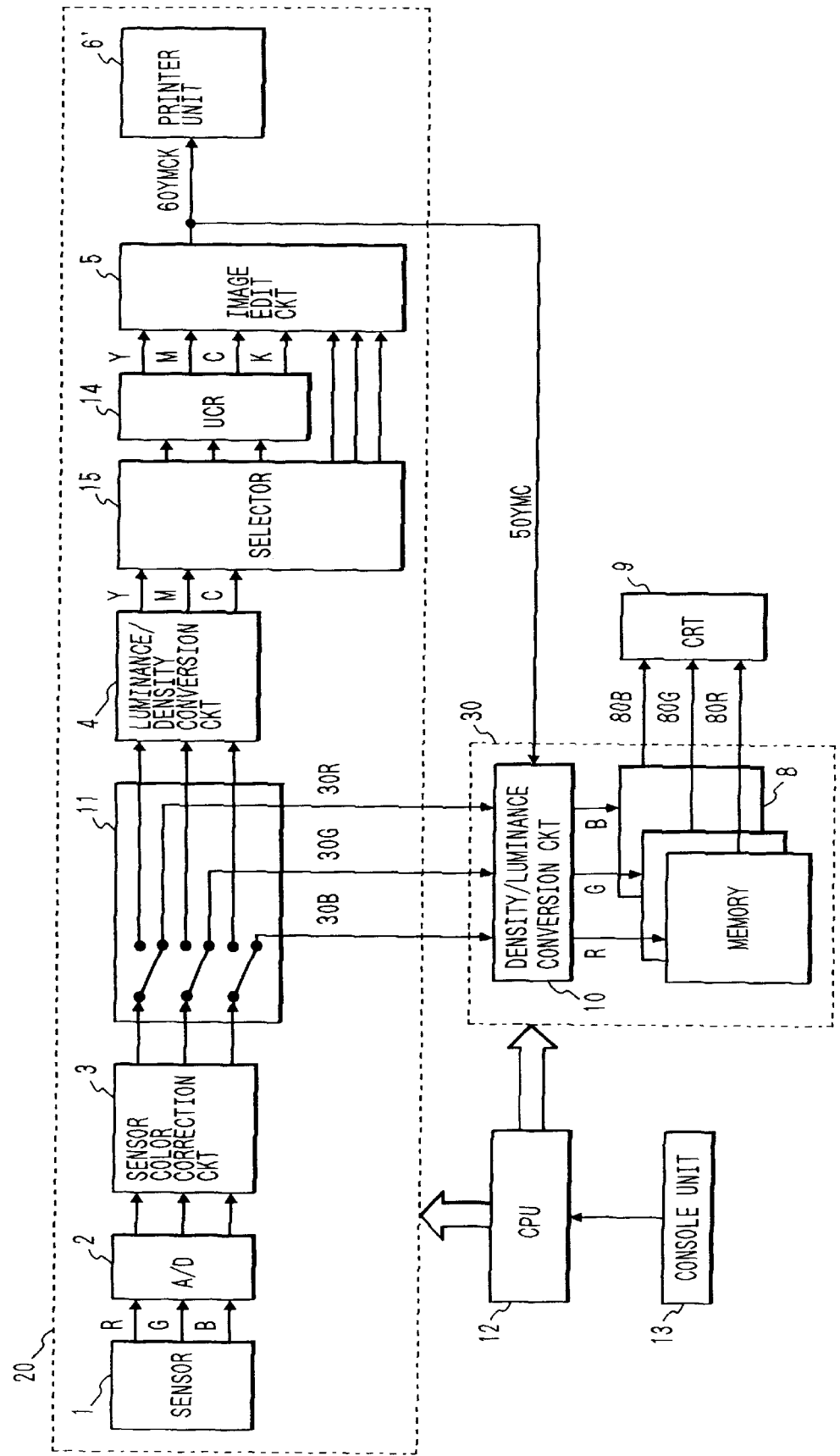
FIG. 7 is a block diagram of an example of the image processing apparatus constituting a third embodiment of the present invention.
Figure 8:
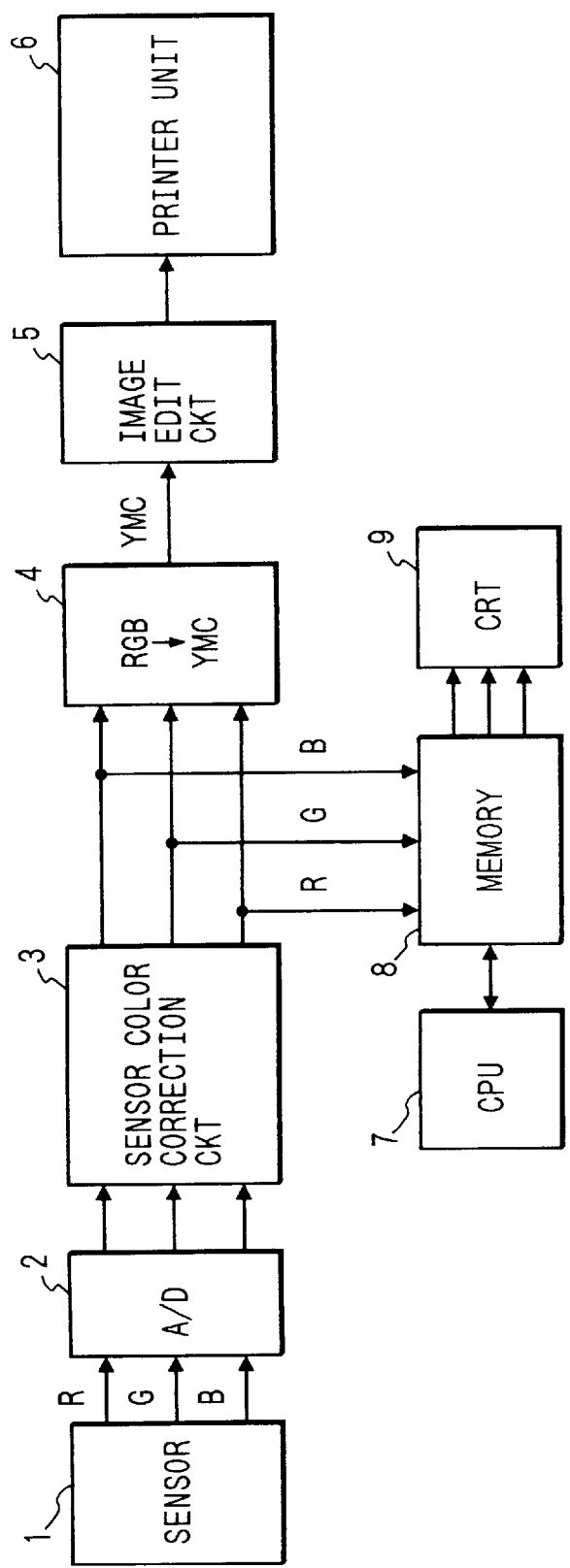
FIG. 8 is a block diagram of a conventional image processing apparatus.

FIG. 7 is a block diagram showing an example of the image processing apparatus of the present invention, wherein components same as those in FIG. 1 are represented by same numbers and will not be explained further.

In this embodiment, the printer 6' effects image formation with four colors of Y, M, C and K. At first, as in the 1st embodiment, the R, G, B data entered by the luminance/density conversion circuit 4 are converted into C, M, Y data. In case of the printing operation, a selector 15 sends, under the control of the CPU 12, the entered Y, M, C data to a UCR circuit 14, which effects the undercolor removal and the black color formation on the entered Y, M, C data to generate Y, M, C, K data in 4-color mode for supply to the image editing circuit 5.

On the other hand, in case of the previewing operation, the selector 15 sends, under the control of the CPU 12, the Y, M, C data entered from the luminance/density conversion circuit 4 to the image editing circuit 5 in the 3-color mode.

The image editing circuit 5 effects the editing operation set by the operation console unit 13 on the entered Y, M, C, K or Y, M, C data. Thus, in case of the previewing operation, the Y, M, C data 50 are supplied to the preview process unit 30, and in case of the printing operation, the Y, M, C, K data 60 originated by the UCR circuit 14 are supplied to the printer 6'.

Consequently, the difficulties associated in the conversion of the Y, M, C, K data into the R, G, B data, such as the complex calculations required and the unfaithful reproduction of the color indicated by the Y, M, C, K data, can be resolved by the conversion of the Y, M, C data into the R, G, B data by the preview process unit 30, which only requires simpler calculations and enables more faithful color reproduction.

In the foregoing embodiment, the printing operation is conducted only in the 4-color mode, but it is also possible to adopt the 3-color mode and the 4-color mode selectably according to the setting of the operation console unit.

[4th embodiment]

In the following there will be explained a 4th embodiment of the present application.

The configuration of the image processing apparatus of this embodiment is same as shown in FIG. 1.

In the 1st and 2nd embodiments, the display path is selected automatically by the CPU 12 according to the mode set in the operation console unit, but a similar effect can also be obtained by manual selection of the control, for example display by 1 scan or 3 scans, on the operation console unit.

In case of such manual selection, there can be obtained a preview display matching the requirement of the user, such as a preview image without editing even when the printed image involves editing.

Figure 6:
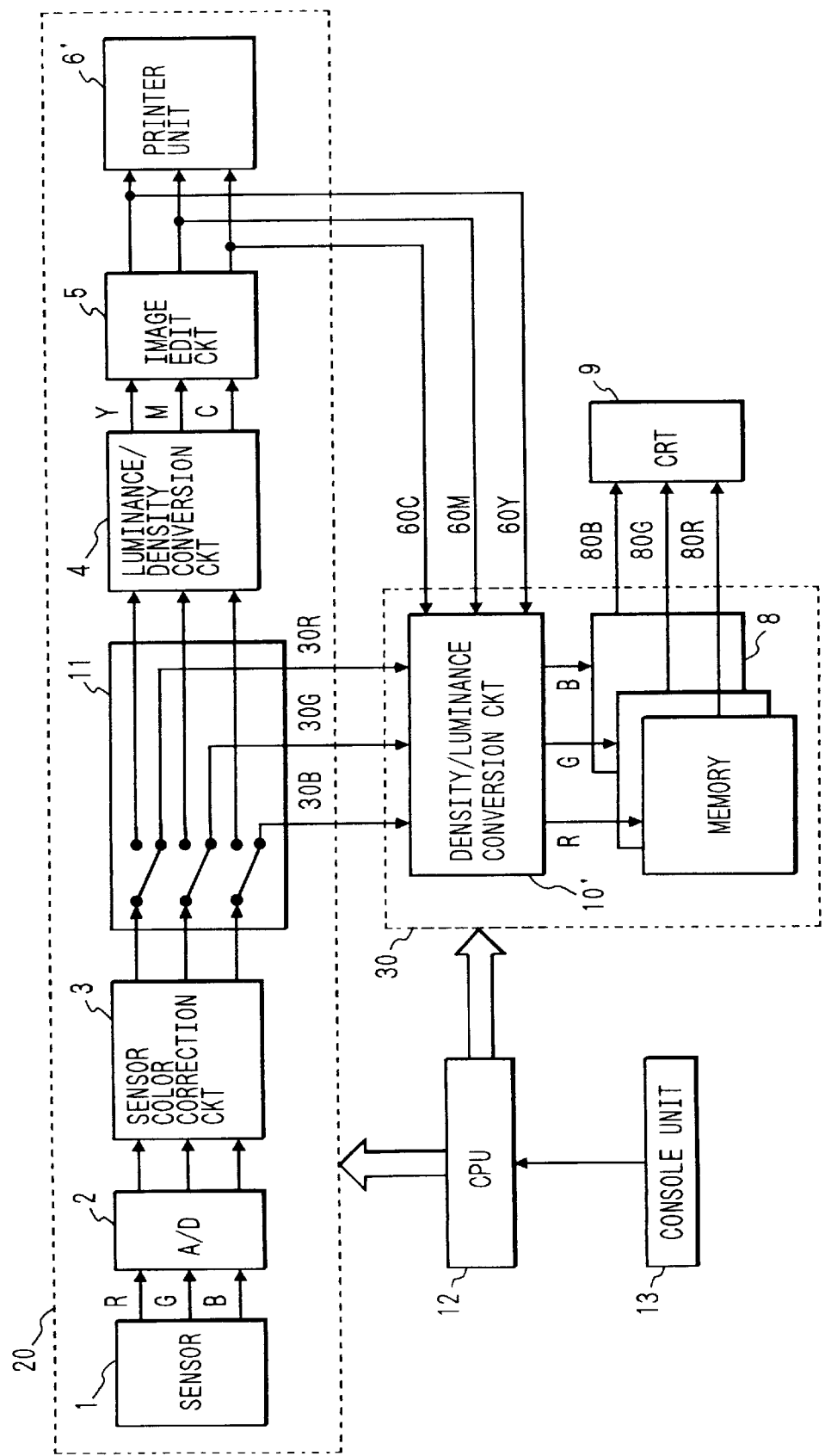
FIG. 6 is a block diagram of a variation of the image processing apparatus of the present invention.

In the foregoing embodiments, the image editing circuit 5 is so constructed as to provide frame-sequential outputs such as 50YMC, but the present invention not limited to such embodiments and the Y, M, C signals may be released in parallel manner as shown in FIG. 6.

In the configuration shown in FIG. 6, the printer 6; is provided with plural recording units for forming image with different colors, and these recording units form images in succession in one pass of the recording medium, so that a full-color image can be formed at a high speed.

The present invention is applicable to a system consisting of plural equipment or to an apparatus consisting of a single equipment.

Furthermore the present invention is applicable to a case in which the present invention is achieved by the supply of a program to a system or an apparatus.

As explained in the foregoing embodiments, even in case image editing is conducted, there can be effectively obtained a preview image reflecting the result of such image editing.

Also a preview image can be obtained efficiently based on the pre-set editing process.

Furthermore the image data to be supplied to the display means can be generated with simple calculations.

Furthermore the preview image can be obtained efficiently in time.

What is claimed is:

1. An image processing apparatus comprising:
    discriminating means for discriminating whether or not an image editing process has been set;
    input means for inputting luminance data;
    luminance-to-density conversion means for converting the luminance data into density data;
    image processing means for performing the image editing process on the density data from said luminance-to density conversion means in a case that said discriminating means discriminates that the image editing process has been set;
    outputting means having (1) a first mode to output preview image data based on the luminance data, and (2) a second mode to output preview image data based on the density data subjected to the image editing process; and
    controlling means for controlling said outputting means to operate in the first mode or the second mode based on whether or not said discriminating means discriminates that the image editing process has been set.

2. An apparatus according to claim 1, wherein the preview image data is corrected in accordance with a display characteristic of a display means.

3. An apparatus according to claim 1, wherein said setting means sets the condition on the basis of manual instructions input by a user.

4. An apparatus according to claim 1, wherein the image editing process includes a color balance process and a working edit process.

5. An apparatus according to claim 1, further comprising:
    a scanner unit for scanning an original image to generate the luminance data; and
    an image formation unit for forming an image on the basis of the density data which was subjected to the image editing process.

6. An image processing apparatus comprising:
    setting means for setting a color process and an edit process;
    discriminating means for discriminating whether or not the color process has been set;
    inputting means for inputting luminance data;
    luminance-to-density conversion means for performing luminance-to-density conversion on the luminance data;
    processing means for performing the edit process on data output from said luminance-to-density conversion means and for performing the color process on the data output from said luminance-to-density conversion means in a case that the color process has been set; and
    preview processing means for performing a preview process based on data output from said processing means,
    wherein, in a case that a color process has not been set, said luminance-to-density conversion means does not perform the luminance-to-density conversion and said processing means performs the edit process on the luminance data.

7. An apparatus according to claim 6, wherein the preview process includes performing color correction according to a monitor characteristic.

8. An image processing apparatus comprising:
    input means for inputting image data which corresponds to an original image;
    setting means for setting an editing process;
    editing means for effecting the editing process set by said setting means on the input image data;
    first preview image data output means for providing preview image data which is based on the image data input by said input means;
    second preview image data output means for providing preview image data which is based on the image data which has been subjected to the editing process by said editing means; and
    selection means for selecting said first or second preview image data output means based on the editing process set by said setting means;
    wherein the image data input by said input means comprises luminance data, and image data output from said editing means comprises density data, and wherein the apparatus further comprises luminance-density conversion means for converting the luminance data, input by said input means, into density data; and wherein the editing process effected by said editing means includes a process involving color conversion, and, in a case that said editing process involving the color conversion is not set by said setting means, conversion from the luminance data into the density data is not conducted in said luminance-density conversion means and the editing process in said editing means is conducted with the luminance data.

9. An apparatus according to claim 6, further comprising:

a scanner unit for scanning an original image to generate the luminance data; and an image formation unit for forming an image on the basis of the data output from said processing means.

10. An image processing method comprising:

a discriminating step for discriminating whether or not an image editing process has been set;

an input step for inputting luminance data;

a luminance-to-density conversion step of converting the luminance data into density data;

an image processing step of performing the image editing process on the density data produced by said luminance-to-density conversion step in a case that it is descriminated in said discriminating step that the image editing process has been set;

an outputting step having (1) a first mode to output preview image data based on the luminance data, and (2) a second mode to output preview image data based on the density data subjected to the image editing process; and a controlling step of controlling said outputting step to operate in the first mode or the second mode based on whether on not it is discriminated in said discriminating step that the image editing process has been set.

11. An image processing method comprising:

a setting step of setting a color process and an edit process;

a discriminating step for discriminating whether or not the color process has been set;

an inputting step for inputting luminance data;

a luminance-to-density conversion step of performing luminance-to density conversion on the luminance data;

a processing step of performing the edit process on data output from said luminance-to-density conversion step and for performing the color process on the data output from said luminance-to-density conversion step in a case that the color process has been set; and a preview processing step for performing a preview process based on data output in the processing step;

wherein, in a case that a color process has not been set, said luminance-to-density conversion step does not perform the luminance-to-density conversion and said processing step performs the edit process on the luminance data.

* * * * *

UNITED STATES PATENT AND TRADEMARK OFFICE
CERTIFICATE OF CORRECTION

PATENT NO. : 5,847,848

DATED : December 8, 1998

INVENTORS : YASUMICHI SUZUKI et al.

It is certified that error appears in the above-identified patent and that said Letters Patent is hereby corrected as shown below:

COLUMN 7

Line 32, "printer 6;" should read --printer 6--.

COLUMN 9

Line 28, "descriminated" should read --discriminated--.

COLUMN 10

Line 16, "luminance-to density" should read --luminance-to-density--.

Signed and Sealed this

Seventh Day of September, 1999

Attest:

Q. TODD DICKINSON

Attesting Officer     Acting Commissioner of Patents and Trademarks